US005230764A

United States Patent [19]

Moll

[11] Patent Number: 5,230,764

[45] Date of Patent: Jul. 27, 1993

[54] PROCESS AND DEVICE FOR PRODUCING GARMENTS OR INDIVIDUAL PARTS THEREOF

[76] Inventor: Philipp Moll, Konigsbergerstrasse 7, D-5100 Aachen, Fed. Rep. of Germany

[21] Appl. No.: 474,003

[22] PCT Filed: Oct. 13, 1988

[86] PCT No.: PCT/EP88/00919

§ 371 Date: Apr. 12, 1990

§ 102(e) Date: Apr. 12, 1990

[87] PCT Pub. No.: WO89/03185

PCT Pub. Date: Apr. 20, 1989

[51] Int. Cl.[5] .......... B32B 33/00

[52] U.S. Cl. .......... 156/256; 156/265; 156/269; 156/270; 156/324; 156/440; 83/16; 83/23; 83/33; 83/72; 83/901; 112/262.3; 112/265.1; 112/440; 112/DIG. 3

[58] Field of Search .......... 156/256, 324, 265, 521, 156/269, 270; 112/440, 262.3, 265.1, DIG. 3; 83/16, 23, 33, 72, 901

[56] References Cited

U.S. PATENT DOCUMENTS

| | | | |
|---|---|---|---|
| 2,304,787 | 12/1942 | Avery | 156/268 |
| 3,621,801 | 11/1971 | Huddleston | 112/121.29 |
| 4,154,180 | 5/1979 | Burton | 112/262.3 |
| 4,373,412 | 2/1983 | Gerber et al. | 83/24 |
| 4,935,093 | 6/1990 | Reeb | 156/630 |
| 5,017,262 | 5/1991 | Riesing | 156/630 |

*Primary Examiner*—David A. Simmons
*Assistant Examiner*—Merrick Dixon
*Attorney, Agent, or Firm*—McGlew and Tuttle

[57] ABSTRACT

A process is described for producing garments or individual parts thereof from at least one top fabric, from which the cuts belonging to a garment are cut out in a cutting device and are fed to further processing, wherein, if desired, cuts of a predetermined type are provided with coated lining parts and are attached thereto, wherein during the cutting of the cuts, at least those cuts which will subsequently be provided with lining parts are provided mechanically with marks, and during the attachment of cuts to lining parts, at least one of the parts to be attached is provided with a mark immediately before, during or after the attachment. Separate marking in an operation intended especially for this purpose is thus avoided.

12 Claims, 6 Drawing Sheets

PROCESS AND DEVICE FOR PRODUCING GARMENTS OR INDIVIDUAL PARTS THEREOF

FIELD AND BACKGROUND OF THE INVENTION

The present invention pertains in general to a process for producing garments or individual parts from top fabric cuts and, in particular, to produce lining cuts which are attached to top fabric cuts on processing machines, especially by bonding the lining cuts to the top fabric. The invention relates as well to a device for carrying out the process.

The top fabric cuts and—if applicable—the lining cuts and the units produced from top fabric cuts and lining cuts, shall hereinafter be called bonded units for simplicity's sake. Correct assignment of the bonded unit is of great significance during the industrial production of large lots of garments.

The top fabric cuts and the lining cuts are usually fed in separate stacks or bundles to the processing machines. Usually each bundle of cuts is provided with a merchandise list containing the order number and the number of cut parts (cuts) as the minimum amount of data. Merchandise list of the bundle must be lost, when the cuts are taken out or singled at the processing machines, if not earlier, each cut of one bundle is provided in advance with at least the order number of the merchandise list and its part serial number, which is determined by the number of cuts present in the bundle. This numbering is performed by hand using appropriate aids. The bundles of cuts are turned one by one and each cut in the bundle is numbered one by one. This separation and the assignment at the processing machines, especially the bonding devices, are carried out manually. Consequently, the cuts are moved or taken up by hand at least twice between the operations of cutting and bonding.

Another operation is necessary if the cuts are to be provided with so-called stitch marks for automated processes.

It is known from U.S. Pat. No. 3,621,801 that a sewing station equipped with a sewing machine can be provided with a numbering system by which a bundle number and a part serial number are stamped on the topmost cut of a bundle lying on the sewing table plate. After each stamping, the operator removes the cut thus marked from the bundle, along with the topmost cut of a second bundle, lays the two cuts one on top of another, and sews them together by means of the sewing machine. The cut units identified by the bundle number and the part serial number can be attached to other cut units as intended in subsequent sewing stations.

Even though this numbering system offers the advantage that the cuts are no longer numbered by hand but automatically, it is still necessary to tie a band around every individual bundle after cutting and to provide it with a tag which contains the data needed for the subsequent assignment of individual parts. This measure is to ensure that the assignment of the bundled cuts is maintained during the transportation of the bundles from the cutting shop to the sewing shop.

Cutting devices which cut the cuts of a garment out of a web of top fabric spread out in one layer only, have become known more recently (U.S. Pat. No. 4,373,412 and West German Offenlegungsschrift No. DE-OS 33,15,990). In this procedure, only the cuts which are needed for producing a single garment or an individual part thereof are prepared. Subdivision of the bundle and separation of the individual parts from each other, which are necessary in the above-mentioned process, thus become unnecessary. The cuts thus produced for one garment or one individual part thereof are subsequently taken up from the cutting table and fed to a sewing station. The individual parts, which may be picked up in pairs, can be caught by hand or by a manipulator.

However, it is necessary to provide the cuts or prepared bonding units with marks of the aforementioned type in this case as well in order to control the further processing with them.

On the whole, the following procedure is stated as the state of the art:

a) one or several layers of top fabric are laid out (with a laying machine), b) the cuts are cut out of the top fabric layer(s) with a cutting machine, c) the individual cuts are marked, and d) the marked cuts are fed to the further processing machines, e.g., a bonding device.

SUMMARY OF THE INVENTION

The present invention is based on the above procedure. It is an object of the invention to make the processes that are apparent from this procedure more efficient, especially to reduce the manpower needed, and to propose a device for carrying out this process.

This task is accomplished by a process for producing garments or individual parts from at least one top fabric. The cuts belonging to the garment are produced from the top fabric in a cutting device and are fed forward for further processing. If desired, cuts of a predetermined type are provided with, and attached to, coated lining parts. During the cutting of the cuts, at least those cuts which will not subsequently be provided with lining parts will be provided mechanically with marks. During the attachment of the cuts to the lining parts, at least one of the parts to be attached is provided mechanically with a mark immediately before, during or after the attachment.

The use of manpower for marking, which was common hitherto, is eliminated due to the simultaneous mechanical processing and marking of the individual cuts or units of cuts and lining parts. The time needed for producing the garments can thus be substantially reduced. The marking of cuts can advantageously be limited to cuts which are fed after cutting to sewing machines or other processing machines without intermediate processing. In the case of the other cuts, which are provided with lining parts immediately after cutting, it is sufficient to apply the marks only when these cuts are attached to the lining parts.

It is advantageous to apply stitch marks that may be necessary to the cuts simultaneously with the numbering of cuts.

The numbers or stitch marks or the marks in general are applied, e.g., by direct printing on the cuts or with appropriately printed labels when cutting or attaching the cuts to the lining parts. If sewing machines are used as the processing machines, the numbering is advantageously performed subsequent to the processing.

The marking of the cuts is preferably performed on their left-hand side of the cuts facing upward in the direction of the cuts being moved, so that the mark is machine-readable.

For example, according to another embodiment of the present invention, the marked cuts are removed from the delivery stream, ordered in magazines, or placed on conveyors leading to the downstream processing machines. Provisions are also made, in particular, to remove cuts which are not to be provided with lining parts from the general work stream, with which the lining parts are fed to the other cuts, immediately after cutting.

A further embodiment is based on a device for producing garments, or individual parts thereof, from cuts, and possibly lining parts, with a processing machine for attaching the cuts to the lining parts. The processing machine is preceded by a cut laying station for laying the cuts and the lining parts on each other in the appropriate position for processing, and for feeding same to the processing machine. Devices for mechanically applying marks on to the units of cuts and lining parts fed to the cut laying station are arranged in front of or behind the processing machines. The second part of the task is accomplished by arranging the devices for mechanically applying marks above a conveyor belt, on a support arranged at right angles to the direction of movement, wherein the marking devices, which apply numbers, may be stationary, while the marking devices which produce stitch marks are movable. It is advantageous if the marking devices for stitch marking are movable at right angles to the direction of movement of the conveyor belt and, if desired, also parallel thereto. It is now also possible to move around any type of contour on the cut.

If the conveyor belt is subdivided into a plurality of parallel work belts, each work belt is associated with marking devices of its own. These marking devices can be activated by controlling them in zones and can advantageously be operated either one by one or in groups. Corresponding scanners are provided for controlling same.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIGS. 3, 3A, 3B, and 3C are schematic representations of a cut and of bonded units consisting of cuts and lining parts;

DESCRIPTION OF THE PREFERRED EMBODIMENT

The following definitions are used to clearly identify product components:

A cut is a piece of fabric cut or stamped out of a fabric web, especially a top fabric web.

A lining part is a piece cut or stamped out of a coated material web (textile or the like) for being bonded to a cut.

A processing unit consists of at least two cuts which are attached by sewing.

A bonded unit consists of at least one cut and at least one lining part, which are attached by bonding.

Figure 1:
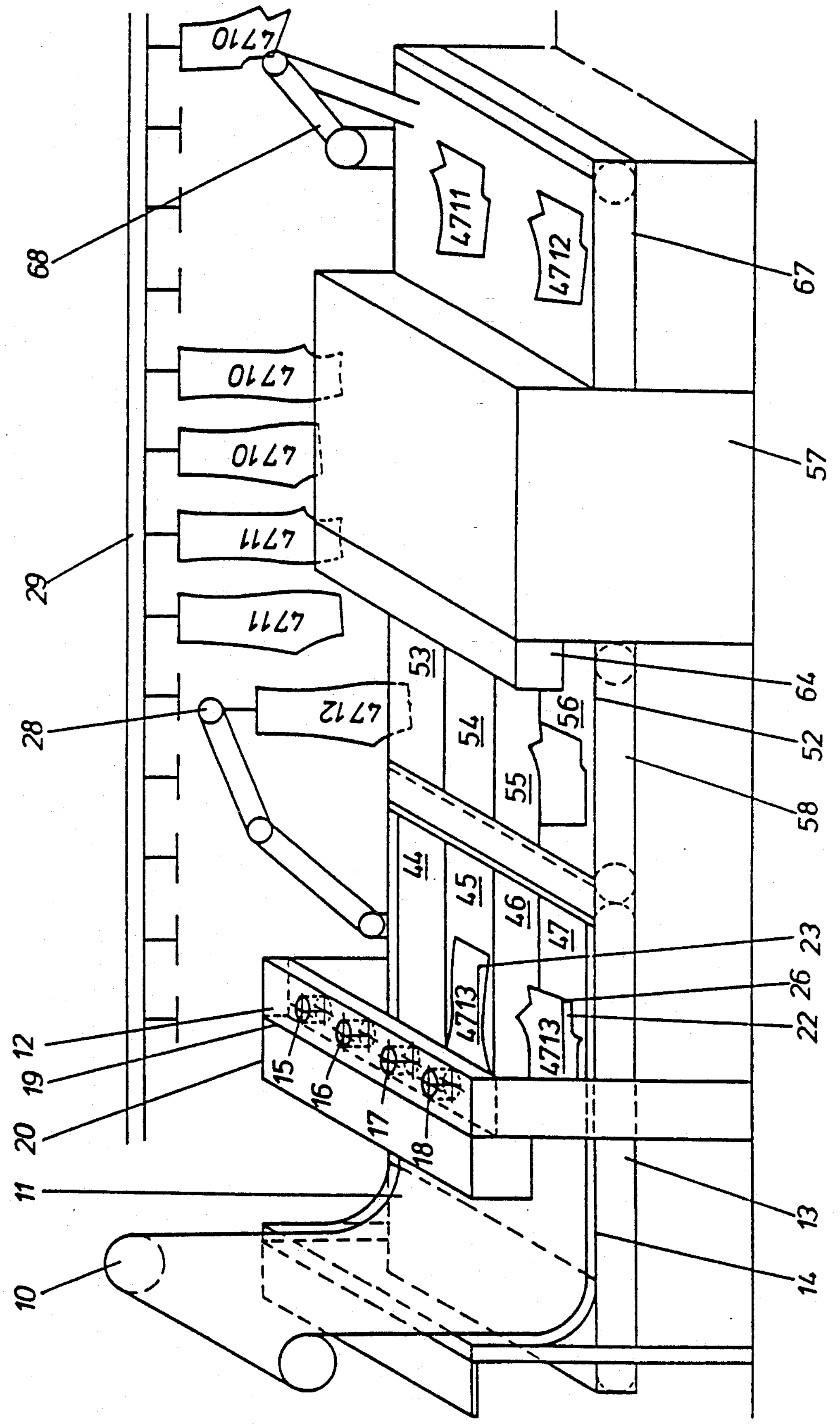
FIG. 1 is a perspective view of a device according to the present invention for carrying out the process.

FIG. 1 shows a device for carrying out the process according to the present invention. A top fabric 11 arriving in one layer from a fabric roll 10 is fed to a cutting device 12 in the zone of a cutting table 13 by means of a conveyor belt 14. The cutting device 12 is provided with four cutting heads 15, 16, 17, and 18, which can be operated simultaneously and independently from each other. The cutting heads 15–18 are fastened on a holding device 19, which also serves to receive a marking device 20.

In the case of the production of individual parts, e.g., sleeves 21, whose cuts 22 and 23 are not lined with lining parts 24 and 25, two of the cutting heads 15–18 of the cutting device cut out the two symmetrical cuts 22 and 23 needed for producing a sleeve. The cuts 22 and 23 are marked by a marking device 20 during the cutting, so that a number 26 is applied for subsequent identification of the cuts 22 and 23, on one hand, and, on the other hand, a stitch mark 27 is applied to both cuts 22 and 23, which are needed for the further processing in a sewing station. When the cuts 22 and 23 have passed both the cutting device 12 and the marking device 20 on the conveyor belt 14, they are removed from the conveyor belt 14 by means of manipulators 28 and transferred onto a floor-mounted conveyor 29 in order to transfer them to a sewing station for further processing.

Figure 2:
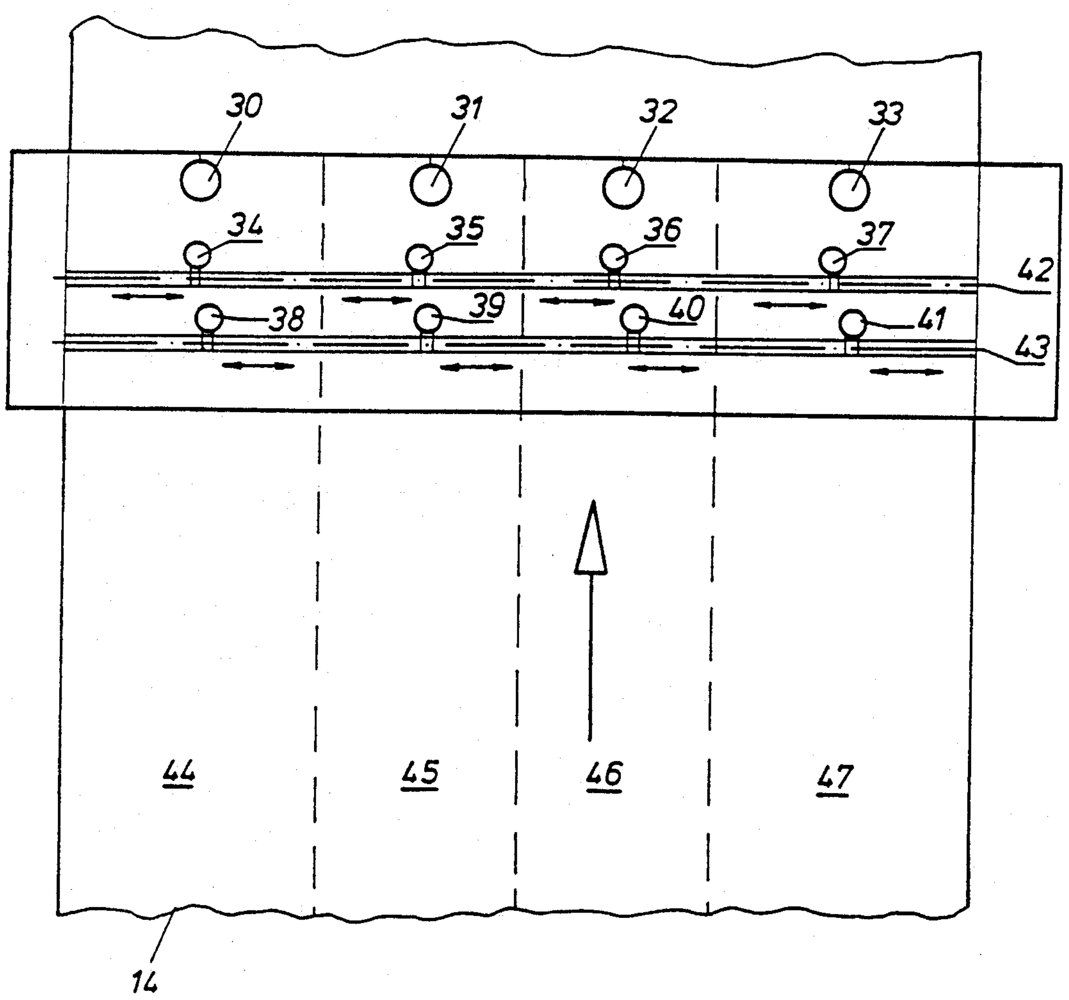
FIG. 2 is a schematic representation of a marking device in a cut laying station of a bonding device in the device according to FIG. 1.

The marking device 20 contains, according to FIG. 2, numbering units 30, 31, 32, and 33, as well as stitch marking units 34, 35, 36, 37, 38, 39, 40, and 41. The numbering units 30–33 are stationary, while the stitch marking units 34–41 are integrated in two groups, namely, the stitch marking units 34–37 and the stitch marking units 38–41, each of which are arranged movably on a crossbeams 42 and 43, respectively. The two crossbeams 42 and 43, which are arranged in parallel to one another and at right angles to the direction of movement, are movable in the direction of movement. The numbering units 30–33 and the stitch marking units 34–41 are distributed within the marking unit 20 so that one each of the numbering units 30–33 and two stitch marking units 34 and 38, 35 and 39, 36 and 40, as well as 37 and 41, which are arranged longitudinally displaceably on different crossbeams 42 and 43, are integrated in zones. These two zones correspond to the subdivision of the conveyor belt 14 into work belts 44, 45, 46, and 47. For example, if a cut 22 is formed in the zone of the work belt 47, it passes through the marking unit 20 so that it first passes by the stitch marking units 37 and 41 and subsequently by the numbering unit 33 arranged centrally above the work belt 47. The stitch marking units 37 and 41 are aligned approximately centrally to the work belt 47 in their resting position. If the cut 22 is delivered into the zone of the stitch marking units 37 and 41, these apply a stitch mark 27 corresponding to the shape of the cut performed by the cutting head 17 or 18 or according to other preset values.

As a consequence of the arrangement of the stitch marking units 37 and 41 in pairs, it is also possible to mark the transverse edge of the cut 22 beginning from the center to the right and left, and subsequently to follow the longitudinal edges of the cut, which is continuously being fed through, and to again perform the transverse movement at the end. The number 26 is applied by the numbering unit 33 at a predetermined point of the cut 22 during the stitch marking process.

If a cut 48 or 49 which has to be lined with and then attached to a lining part 24 or 25 is produced with the cutting device 12, which is necessary, e.g., when producing the front part 50 of a jacket or the back part 51 of a jacket, the marking device 20 located at the cutting device 12 is not activated. The cuts 48 and 49 are subsequently transferred from the conveyor belt 14 to a conveyor belt 52, which is also subdivided into four parallel work belts 53, 54, 55, and 56 and leads to a bonding device 57.

Figure 4A:
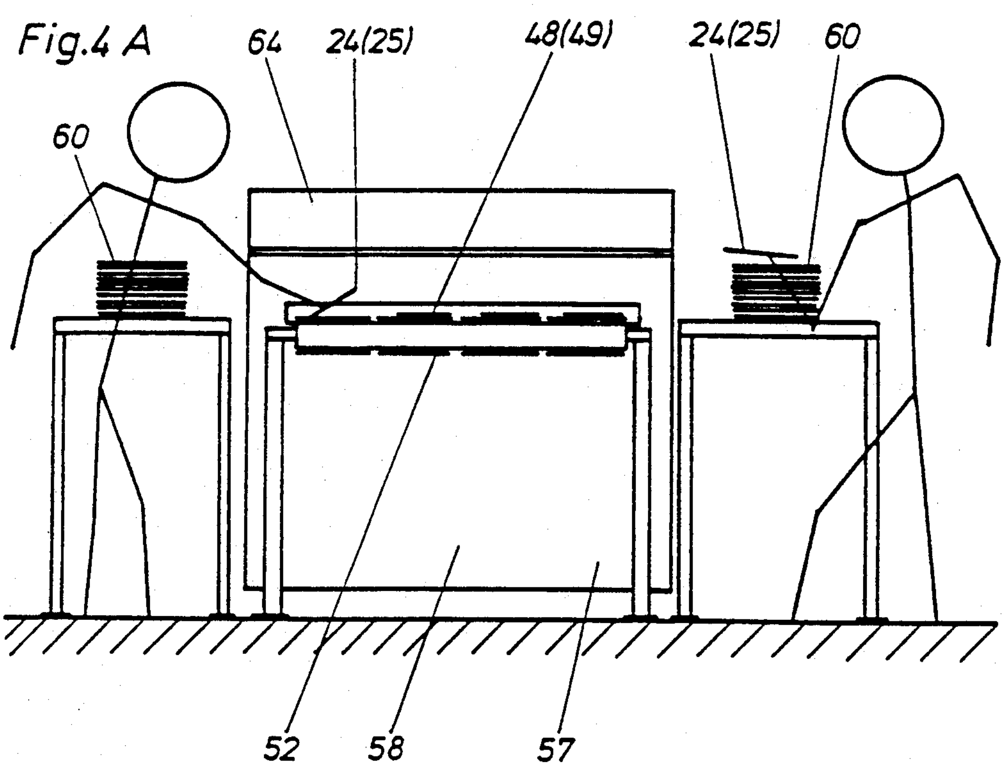
FIGS. 4A and 4B are schematic representations of the manual and mechanical placement, respectively of lining parts onto the cuts prior to entry into the bonding device.
Figure 4B:
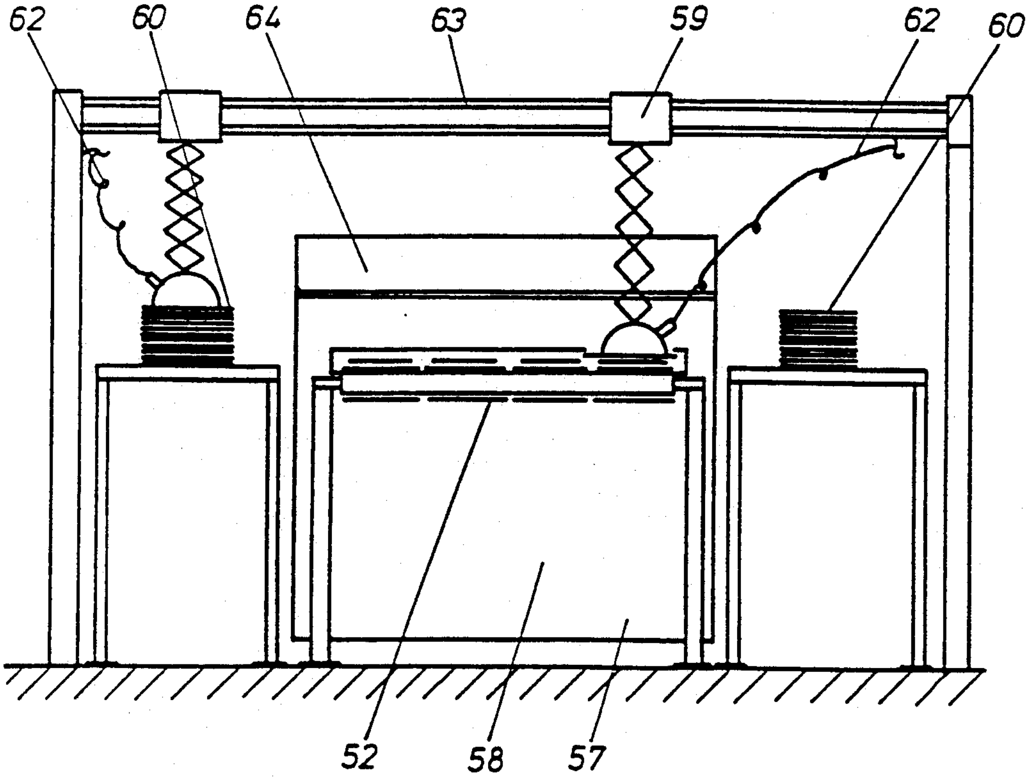

Upstream, i.e., at the entry side, of the bonding device 57 there is a cut laying station 58, in whose zone the lining parts 24 and 25 are placed over the cuts 48 and 49. As is shown in FIG. 4, this can be done manually or mechanically, using manipulators 59. The lining parts 24 and 25 are taken off from a stack 60 by a manipulator 59 with a suction device 61, which is provided with a vacuum connection 62. After taking up the lining parts 24 and 25, the manipulator 59 is moved along a gantry 63 into a position suitable for placing the lining parts 24 and 25 onto the cuts 48 and 49.

Another marking device 64 is located in the zone of the cut laying station 58 immediately in front of the entry into the bonding device 57 and connected thereto. The bonded units 65 and 66 consisting of the cuts 48 and 49 and the lining parts 24 and 25 now pass through the marking unit 64 to be subsequently bonded together in the bonding device 57. While passing through marking device 64, the bonded units 65 and 66 are subjected to the same treatment as the cuts 22 and 23 during their passage through the first marking device 20. After the bonding device from which the bonded units 65 and 66 emerge there is a receiving table 67 where the bonded units 65 and 66 are removed and transferred to the floor-mounted conveyor 29 for being transported to a further processing station.

The marking devices 20 and 64 are provided, in the known manner (not shown), with means for adaptive control of the numbering units 30–33 and the stitch marking units 34–41. Another possibility of controlling the marking devices 20 and 64 is to couple sensors for recognizing the position of the cuts 22 and 23 as well as 48 and 49 and the bonded units 65 and 66 with the contour information which is inherently necessary for the automatic cutting.

The numbering units 30–33 of the marking devices 20 and 64 can be designed as ink jet printers, laser jet printers, etc. However, it is also possible to provide as marking devices paginating stamps or labeling devices, which apply labels provided with printed information. Ink jet printers, laser jet printers, etc., are suitable for use as stitch marking units 34–41.

Figure 5:
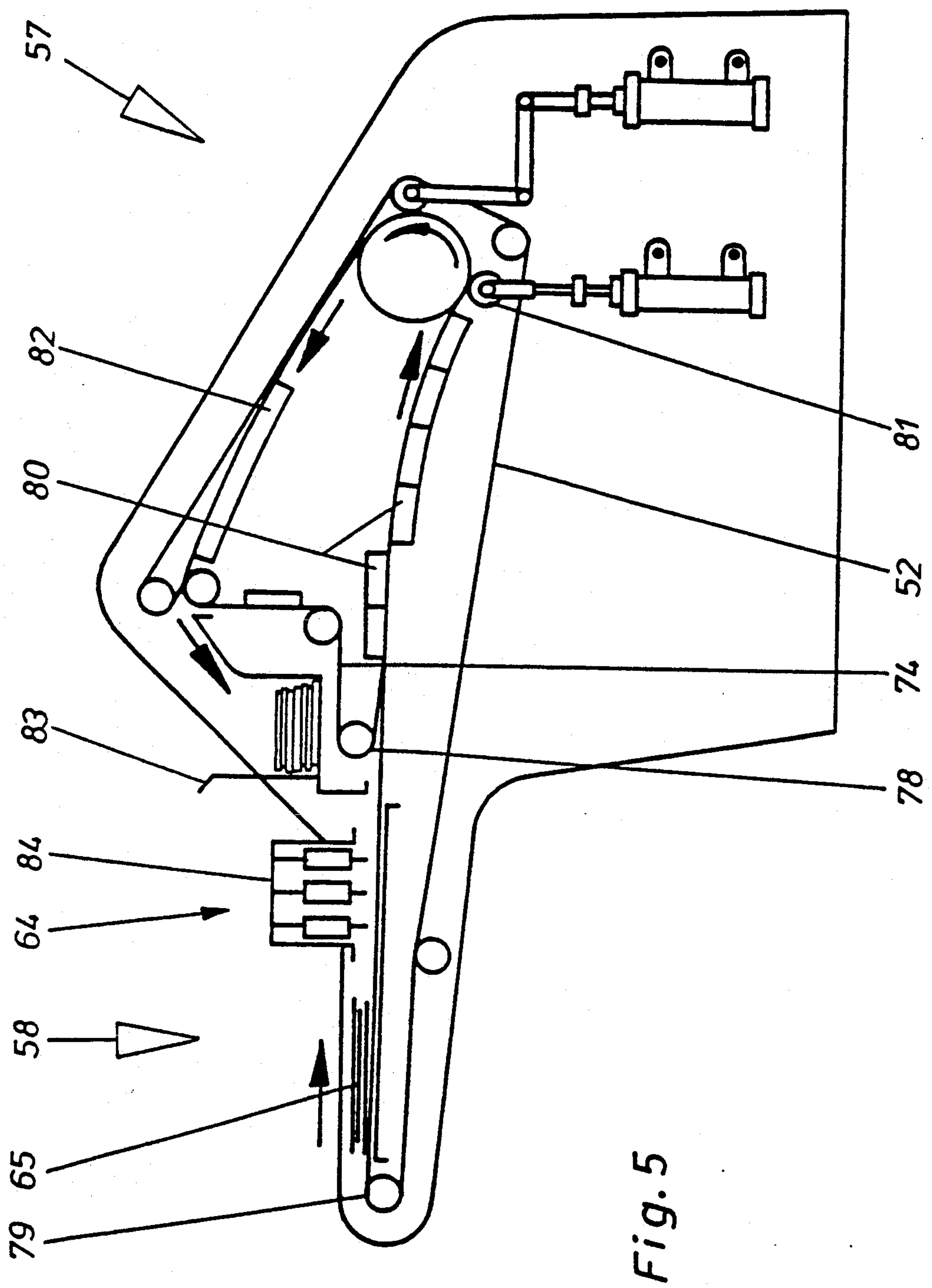
FIG. 5 is a schematic representation of a bonding device in a device according to FIG. 1.

FIG. 5 shows further details of the bonding device 57 for bonded units 65 and 66, which consist of a cut and a lining part. Such a bonding device 57 is essentially known from West German Offenlegungsschrift No. DE-OS 35,02,608. The bonded units 65 and 66 are moved continuously by a conveying device, namely, the above-mentioned, lower conveyor belt 52 and an upper conveyor belt 74. The bonded units 65 and 66 are placed on the conveyor belt 52 in the zone of the cut laying station 58. The bonded units 65 and 66 subsequently pass through the marking devices 64 in order to be fed forward between the individual belt strands 78 and 79, facing each other, of the conveyor belts 74 and 52. After passing through a heating station 80, the bonded units 65 and 66 are fed into a pressing station 81, which is followed by a cooling station 82. The bonded units 65 and 66 thus treated are subsequently collected in a stacking box 83.

The marking device 64 is arranged on a beam 84 in the cut laying station 58 of the bonding device 57. Like the marking device associated with the cutting device 12, the marking device 64 comprises the numbering units 30–33 and the stitch marking units 34–41. The numbering devices 30-33 are arranged stationarily above the conveyor belt 52, whereas the marking devices 34–41 are integrated, as was described previously, in two groups, namely, the stitch marking units 34-37 and the stitch marking devices 38–41, which are arranged movably on a crossbeam 42 and 43 each. The two crossbeams 42 and 43, which are arranged in parallel to one another and at right angles to the direction of movement, are also movable in the direction of movement. The design and the function of the marking device 64 correspond essentially to those of the marking device 20, which is associated with the cutting device 12.

If the bonded unit 65 or 66 is placed on the work belt 53 of the conveyor belt 52 in the zone of the cut laying station 58, it passes through the marking device 64 so that it first passes by the marking units 38 and 34 and then the numbering units 30 arranged centrally above the work belt 53. The stitch marking units 38 and 34 are aligned approximately centrally to the work belt 53 in the resting position. If a bonded unit 65 or 66 is conveyed into the region of the stitch marking units 38 and 34 these perform a stitch marking according to the existing information on the contours of the cut. As a consequence of the arrangement of the stitch marking units 38 and 34 in pairs, it is also possible to mark the transverse edge of the arriving bonded unit 65 or 66 beginning from the center to the right and left, and then to follow the longitudinal edges of the bonded units 65 and 66 that are currently being fed forward and to again perform the transverse movement at the end. The marking is performed by the numbering unit 30 at predetermined points of the bonded unit 65 and 66 during the marking process.

Figure 3C:
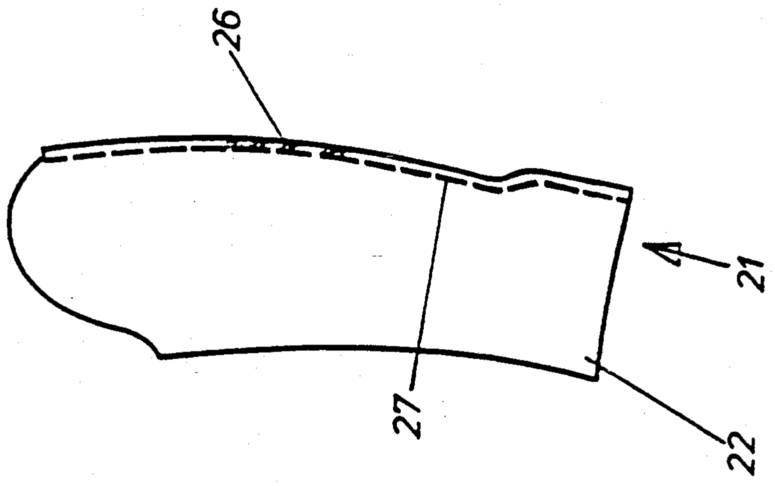
Figure 3B:
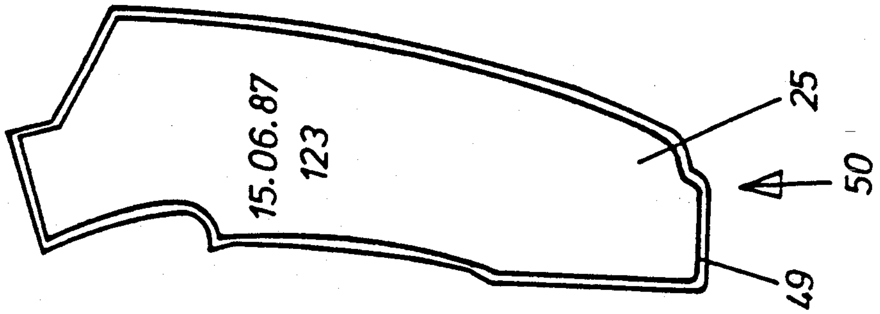
Figure 3A:
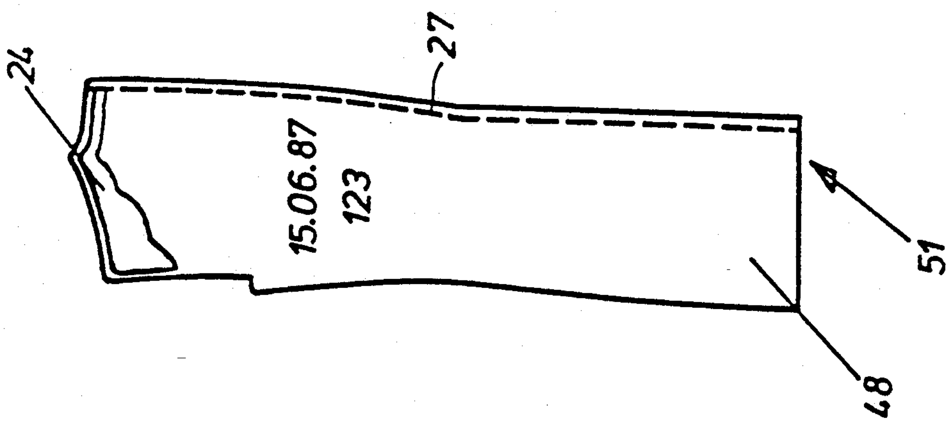

FIG. 3, shows possibilities of adapting the marking device 64 to different applications. Thus, in a jacket back part 51, in which only a small lining part 24 is to be bonded to the cut 48, both the number, represented by the nine-digit number recognizable in FIG. 3, and the stitch mark extending in parallel to the edge are applied only to the cut 48. In the case of a jacket front part 50, on which a nearly congruent lining part 25, except for the lateral seam zone, is bonded to the cut 49, the number is applied to the lining part 25 and the stitch mark is applied to the cut 49 in parallel to its edge. Cuts 22 such as those for a sleeve 21, can be passed through the bonding device 57 without lining parts in order to reach equal shrinkage. In this case, the number, shown at 26 in the edge zone, is applied, like the stitch mark 27, to the cut 22.

The marking device 64 is provided, in a known manner (not shown), with means, e.g., sensors, for adaptive control of the numbering units and stitch marking units. Another possibility of controlling the marking device 64 is to couple sensors for recognizing the position of the bonding device 57 with the information on the contour of the cut, which is inherently necessary for the automatic cutting.

Figure 6:
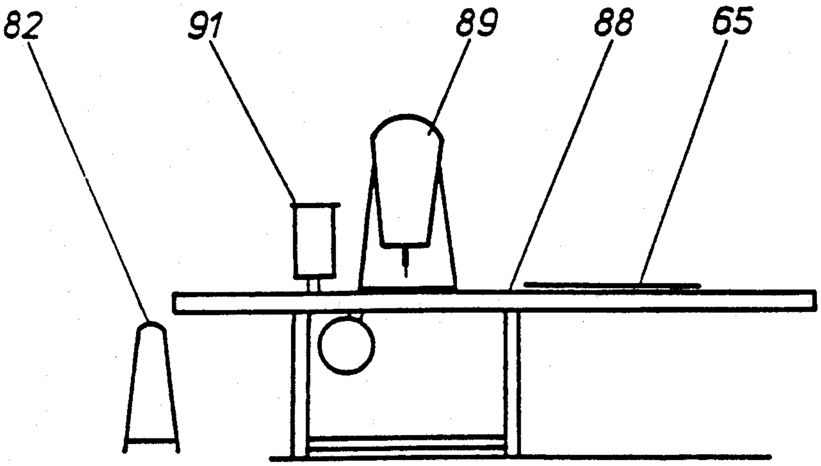
FIG. 6 is a schematic side view of a sewing machine with a numbering device; and, FIG. 7 is a top view of the sewing machine with numbering device according to FIG. 6.
Figure 7:
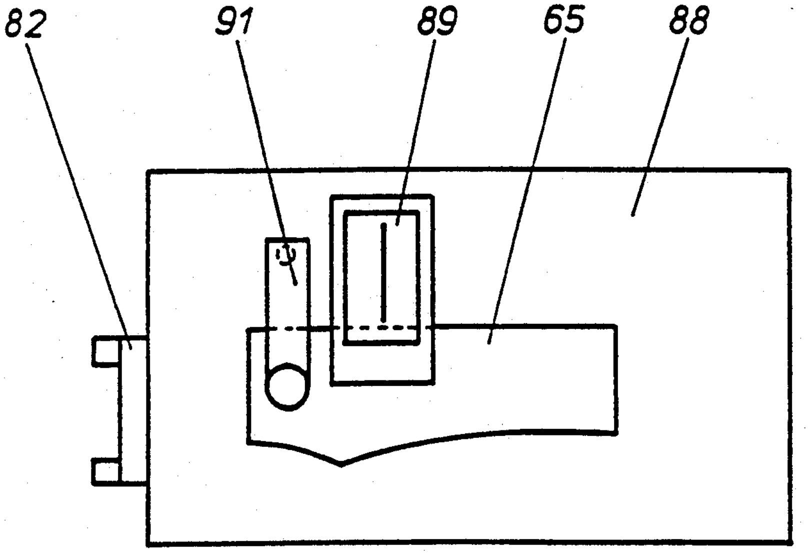

Another application of the process and of the corresponding device is shown in FIGS. 6 and 7. A processing unit 65 is fed to the sewing unit 90 of a sewing machine (automatic sewing machine) 89 in the zone of a cut laying station 88. A numbering unit 91, which follows the sewing machine 89, is activated by a suitable sensor after an edge of the processing unit 65 passes through. The processing unit 65 thus processed and numbered is subsequently placed onto a stacking device 82.

The above-mentioned embodiments, such as numbering stamp, labeling device, ink jet printer, laser jet printer, etc., can also be considered for use for the numbering units and stitch marking units of the marking device at the bonding device or the sewing machine.

While a specific embodiment of the invention has been shown and described in detail to illustrate the application of the principles of the invention, it will be understood that the invention may be embodied otherwise without departing from such principles.

What is claimed is:

1. A process for producing garments or individual parts thereof, the process comprising the steps of:
- producing cuts from a top fabric;
- mechanically marking said cuts which will not be receiving coated lining cuts, said mechanical marking being performed during said producing of said cuts from said to fabric;
- attaching coated lining parts to remaining unmarked top fabric cuts; and,
- mechanically marking said top fabric cuts combined with said coated lining cuts at a time selected from the group consisting of before, during and after the attachment of said coated lining cuts.

2. A process in accordance with claim 1, wherein:
- said marking is performed automatically and mechanically, and conveys number and assignment information along with stitch marks if necessary with a time overlap.

3. A process in accordance with claim 1, wherein:
- said marking is applied according to one of the following methods: direct printing or attaching stock-on printed labels.

4. A process in accordance with claim 1, wherein:
- said marking produces a machine-readable mark on an upper left hand side of said marked cuts.

5. A process in accordance with claim 1, further comprising:
- separating said cuts, not receiving coated lining cuts, for separate processing, before remaining cuts receive said coated lining cuts.

6. A process in accordance with claim 1, further comprising:
- separating said cuts according to their marks;
- placing a group of said cuts having predetermined marks in a magazine and placing remaining cuts on further conveyor belts.

7. A process for producing garments or individual parts thereof, the process comprising the steps of:
- providing a single fabric;
- transporting said fabric along a first conveyor belt;
- cutting a plurality of different type cuts from said fabric during said transporting of said fabric on said first conveyor belt;
- mechanically marking one type of said plurality of different type cuts while said one type of cut is transported on said first conveyor belt, said marking applying stitch marks and bundle marks to said one type of cut;
- removing said marked cuts from said first conveyor belt before said first conveyor belt transports said plurality of different type cuts to an end of said first conveyor belt;
- providing a second conveyor belt whose direction of movement is in the substantially same general direction as said first conveyor, said second conveyor having a beginning at an end of said first conveyor belt, said second belt receiving said cuts remaining one said first conveyor belt after said removing of said marked cuts from said first conveyor belt, said remaining cuts being transported by said second conveyor;
- combining lining cuts with said remaining cuts on said second conveyor belt during said transporting of said remaining cuts on said second conveyor belt;
- mechanically marking said combined remaining cuts during said transporting of said combined remained cuts on said second conveyor belt, said marking applying stitch marks and bundle marks to said combined remaining cuts; and
- bonding said lining cuts to said remaining cuts during said transporting of said remaining cuts on said second conveyor belt.

8. A process in accordance with claim 7, wherein;
- said bonding is done by heating said remaining cuts and said lining cuts.

9. A process in accordance with claim 7, wherein:
- said mechanical marking of said one type of cut and said combined remaining cuts being performed by marking means moving substantially perpendicular to a direction of movement of said conveyor belts.

10. A process in accordance with claim 7, further comprising:
- providing a manipulator means for said removing of said marked cuts from said first conveyor belt.

11. A process in accordance with claim 7, wherein:
- said mechanical marking is performed by a first marking means for said applying of said stitch marks, and a second marking means for applying said bundle marks.

12. A process for producing garments or individual parts thereof, the process comprising the steps of:
- producing cuts from a top fabric;
- mechanically marking said cuts which will not be receiving coated lining cuts, said mechanical marking being performed during said producing of said cuts from said top fabric;
- attaching coated lining parts to remaining unmarked top fabric cuts; and
- mechanically marking said top fabric cuts combined with said coated lining cuts before the attachment of said coated lining cuts.

* * * * *